United States Patent
Gay et al.

(10) Patent No.: US 8,291,328 B2
(45) Date of Patent: Oct. 16, 2012

(54) SYSTEM AND METHOD FOR SYNCHRONIZING A REAL-TIME PERFORMANCE WITH A VIRTUAL OBJECT

(75) Inventors: Michael Gay, Collinsville, CT (US); Michael Zigmont, Kensington, CT (US); Robert Hess, Bristol, CT (US); Anthony Bailey, Wallingford, CT (US)

(73) Assignee: Disney Enterprises, Inc., Burbank, CA (US)

( * ) Notice: Subject to any disclaimer, the term of this patent is extended or adjusted under 35 U.S.C. 154(b) by 732 days.

(21) Appl. No.: 12/383,557

(22) Filed: Mar. 24, 2009

(65) Prior Publication Data

US 2010/0247060 A1 Sep. 30, 2010

(51) Int. Cl.
G06F 3/048 (2006.01)
G06T 15/00 (2006.01)

(52) U.S. Cl. .......................... 715/757; 345/419
(58) Field of Classification Search .......................... None
See application file for complete search history.

(56) References Cited

U.S. PATENT DOCUMENTS

| 4,442,674 | A | 4/1984 | Fohl |
|---|---|---|---|
| 4,457,599 | A | 7/1984 | Sawicki |
| 5,400,069 | A | 3/1995 | Braun |
| 6,624,853 | B1 | 9/2003 | Latypov |
| 6,882,358 | B1 | 4/2005 | Schuster |
| 6,952,312 | B2 | 10/2005 | Weber |
| 2002/0186221 | A1 | 12/2002 | Bell |
| 2002/0190923 | A1* | 12/2002 | Ronzani et al. ................. 345/50 |
| 2004/0104935 | A1 | 6/2004 | Williamson |
| 2005/0122308 | A1 | 6/2005 | Bell |

OTHER PUBLICATIONS

Borkowski, Stanislaw, *Steerable Interfaces for Interactive Environments*, Institut National Polytechnique de Grenoble, Jun. 26, 2006.
Balcisoy, et al., *Interaction between Real and Virtual Humans in Augmented Reality*, Proc. Computer Animation '97, IEEE CS Press, pp. 31-38 (1997).
Broll, et al., *Interactive Props and Choreography Planning with the Mixed Reality Stage*, IFIP International Federation fro Information Processing, pp. 185-192 (2004).

* cited by examiner

*Primary Examiner* — Brandon Hoffman
(74) *Attorney, Agent, or Firm* — Farjami & Farjami LLP

(57) ABSTRACT

There is presented a system for recording a performance by a real-time performer interacting with a virtual object. The disclosed system comprises a projection module including a polarizing filter, the projection module configured to generate a polarized visible image corresponding to the virtual object. The system includes a surface for displaying the polarized visible image, the surface viewable by the real-time performer. The system also includes a recording module including a reverse-polarizing filter, the reverse-polarizing filter configured to reverse-polarize images of the performance by the real-time performer and the surface displaying the polarized visible image to produce reverse-polarized images. The recording module is configured to record the reverse-polarized images. In one embodiment, the system further comprises a rendering module configured to render the virtual object into the recorded performance.

20 Claims, 4 Drawing Sheets

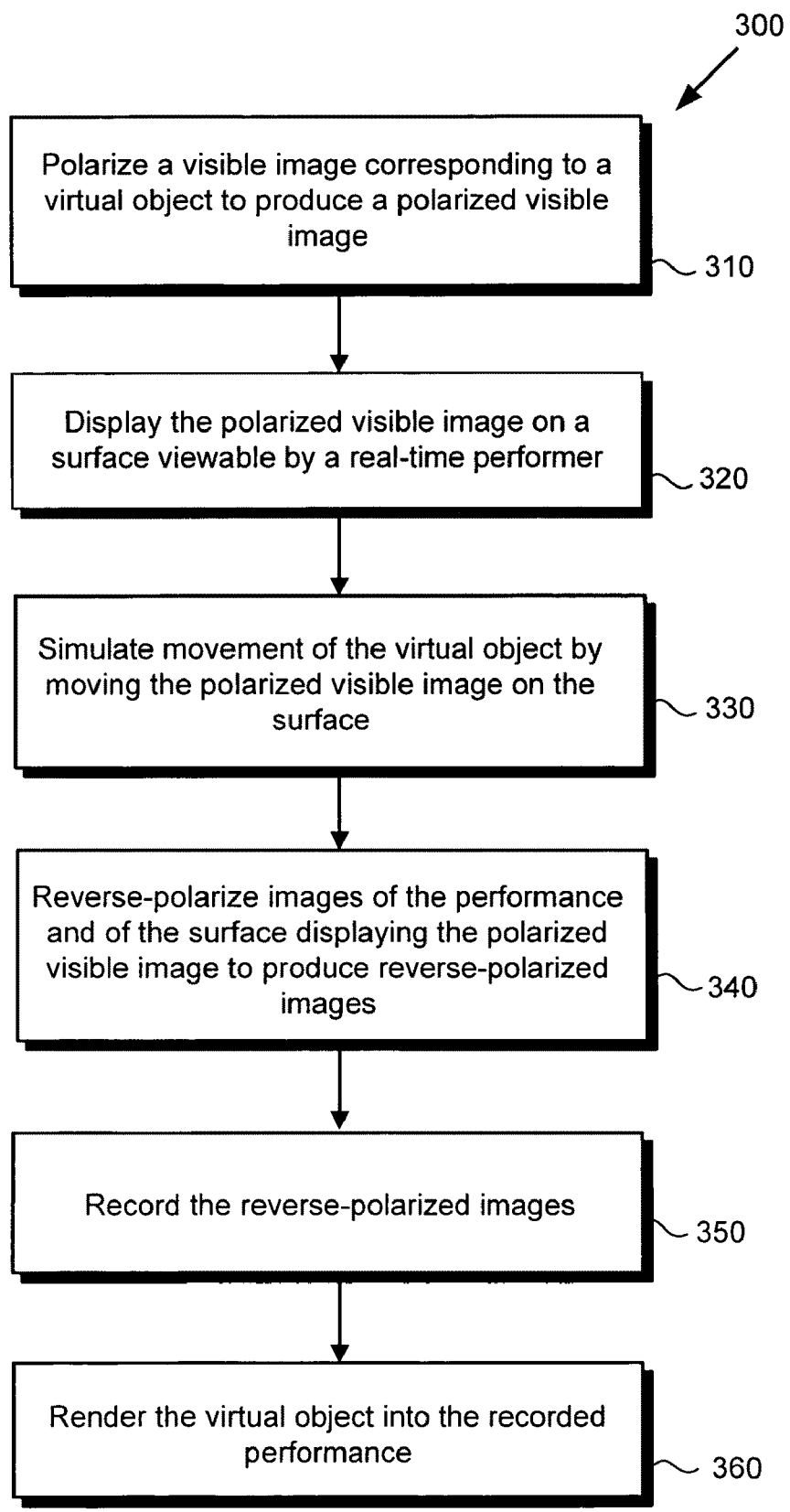

SYSTEM AND METHOD FOR SYNCHRONIZING A REAL-TIME PERFORMANCE WITH A VIRTUAL OBJECT

BACKGROUND OF THE INVENTION

1. Field of the Invention

The present invention is generally in the field of videography. More particularly, the present invention is in the field of special effects and virtual reality.

2. Background Art

Videography is an effective medium for delivering evocative and stimulating viewing content to a wide audience. Inevitably, however, even as powerful a content delivery technique as videography is constrained by the practical limitations imposed by its own requirements for recording equipment, appropriate lighting, and other environmental controls. As a result, some scenes that a videographer may envision and wish to incorporate into a presentation, might, because of these practical limitations, never be given full artistic embodiment. Consequently, some aesthetically desirable elements of a video presentation may have to be omitted entirely, or when included, be provided in a less than optimally pleasing or realistic manner.

As specific examples of video presentations that may be shaped by their environment, television sports and news presentations can be heavily reliant on the technical resources of a studio set to support and assure their production standards. A studio set often provides optimal lighting, audio transmission, sound effects, announcer cueing, screen overlays, and production crew support, in addition to other technical advantages. The studio set, however, typically provides a relatively fixed spatial format and therefore may not be able to accommodate especially large, numerous, or dynamically interactive objects without significant modification, making the filming of those objects in studio, costly or perhaps entirely impracticable.

One conventional approach to including video footage of very large, cumbersome, or moving objects in studio set based video productions is to videotape those logistically challenging objects on location, as an alternative to filming them in studio. For example, large or moving objects may be shot remotely, and integrated with a studio based presentation accompanied by commentary from and perhaps simulated interaction by a real-time performer present in studio, such as an anchor or analyst. Unfortunately, this conventional solution requires sacrifice of some of the technical advantages that the studio setting provides, while imposing the sometimes significant production costs flowing from the transport and support of personnel and equipment in the field to provide the remote filming. Furthermore, effective filming of large or cumbersome objects on location may still remain problematic because their unwieldiness may make it difficult for them to be moved smoothly or to be readily manipulated to provide an optimal viewer perspective.

Another conventional approach to compensating for the limitations imposed by studio based video productions makes use of general advances in computing and processing power, which have made rendering virtual objects a realistic alternative to filming live objects that are difficult or expensive to capture. Although this alternative may help control production costs, there are also drawbacks associated with conventional approaches to rendering virtual objects. One significant drawback is that the virtual objects rendered according to conventional approaches are typically unseen by the real-time performers in studio. As a result, the real-time performers must either simulate interaction with a completely invisible object, or look off-stage to a monitor providing cues to the simulated interaction. In either case, there is likely to be a sizeable reality gap for a viewer of the presentation when the virtual object is combined with footage of the real-time performer in action.

Accordingly, there is a need to overcome the drawbacks and deficiencies in the art by providing a solution for synchronizing a performance by a real-time performer with a virtual object, such that a viewer is presented with a pleasing and convincing simulation of real-time or imagined events.

SUMMARY OF THE INVENTION

There are provided systems and methods for synchronizing a real-time performance with a virtual object, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 is a flowchart presenting a method for synchronizing a performance by a real-time performer with a virtual object, according to one embodiment of the present invention.

DETAILED DESCRIPTION OF THE INVENTION

Figure 1:
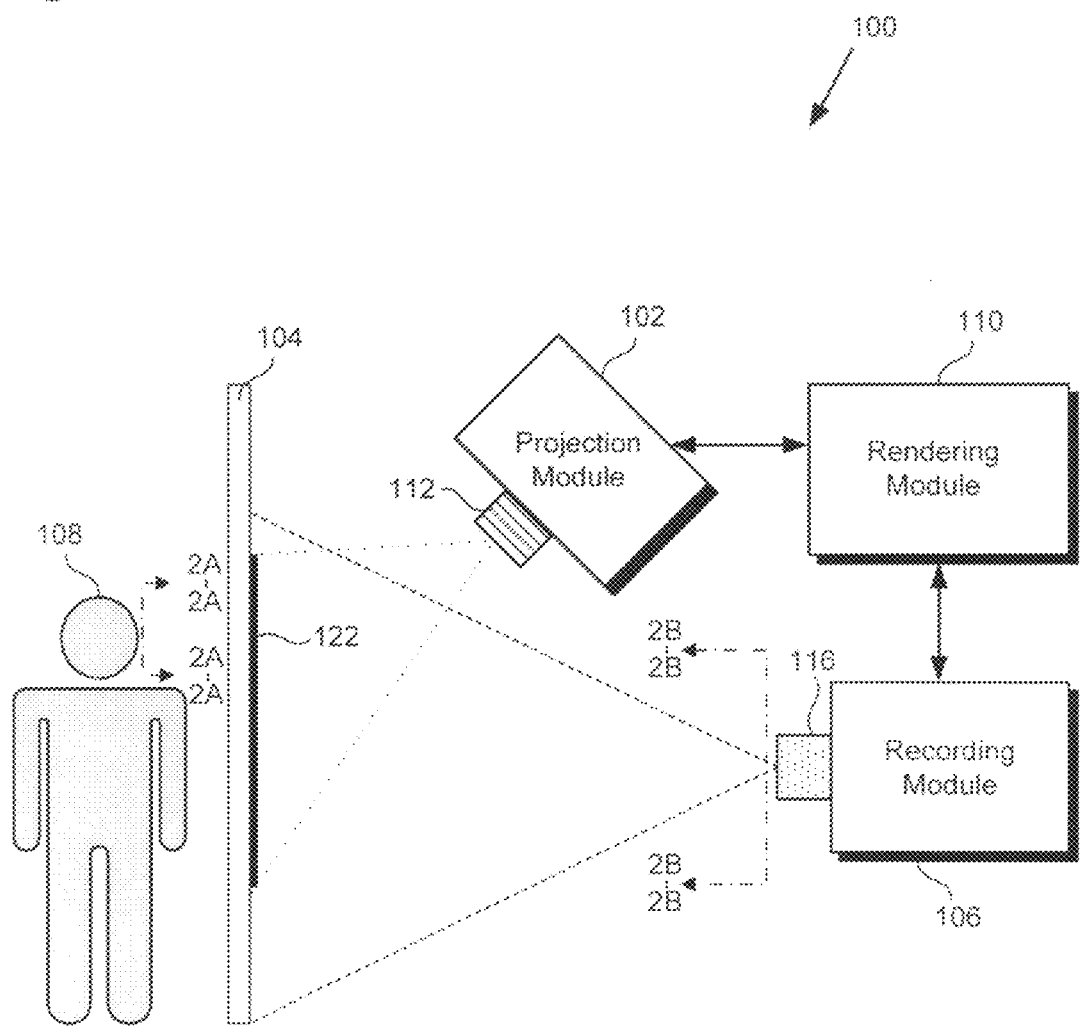
FIG. 1 shows a block diagram of a system for synchronizing a performance by a real-time performer with a virtual object, according to one embodiment of the present invention.

The present application is directed to a system and method for synchronizing a performance by a real-time performer with a virtual object. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

The present inventors recognize the drawbacks and deficiencies of conventional solutions for coordinating interaction between a real-time performer and a virtual object unseen by the real-time performer. Moreover, the present inventors have succeeded in overcoming those disadvantages by providing a system and method for synchronizing the actions of a real-time performer with the presence of a virtual object so as to enhance the realism of such a performance. FIG. 1 shows a block diagram of system 100 for synchronizing a performance by a real-time performer with a virtual object, according to one embodiment of the present invention. In the embodiment of FIG. 1, system 100 comprises projection module 102 including polarizing filter 112, surface 104 on which is displayed polarized visible image 122, and recording module 106 including reverse-polarizing filter 116. Also shown in FIG. 1 are real-time performer 108 and rendering module 110.

According to the embodiment of FIG. 1, projection module 102 may be configured to utilize polarizing filter 112 to generate polarized visible image 122 corresponding to the virtual object. Surface 104, which may be any substantially transparent surface, for example, is shown by FIG. 1 to be viewable by real-time performer 108. System 100 may utilize surface 104 to display polarized visible image 122 generated by projection module 102 to real-time performer 108. As further shown by FIG. 1, recording module 106 is positioned to record a performance of real-time performer 108 through surface 104. Recording module 106 includes reverse-polarizing filter 116, which may be configured to reverse-polarize images of the performance of real-time performer 108 and surface 104, thereby blocking polarized visible image 122 generated by polarizing filter 112 of projection module 102.

In FIG. 1, projection module 102 and recording module 106 are shown to be communicatively linked to rendering module 110. Such representation is merely for the purposes of example, however, and in other embodiments, rendering module 110 may not be present in system 100. System 100 is configured to produce a recorded performance by the real-time performer synchronized with the virtual object, which may be unseen by the real-time performer at the time of the performance. In embodiments in which rendering module 110 is present, as shown in FIG. 1, rendering module 110 may be configured to render the virtual object into the recorded performance.

For example, in one embodiment, system 100 may be implemented in a television news or entertainment studio to simulate interaction of a studio host with a virtual object corresponding to an athlete featured in a contemporary sports highlight. In that embodiment, system 100 may be configured to record the performance of the real-time performer, e.g., movements of the studio host, interacting with the virtual object corresponding to polarized visible image 122. The virtual object may comprise a moving image of the athlete as he or she performs an athletic feat, such as running a basketball play, for example. In some embodiments representative of the present example, projection module 102 may be configured to utilize polarizing filter 112 to simulate movement of the virtual object, e.g., featured athlete, through corresponding movement of the polarized visible image displayed on surface 104. The polarized visible image corresponding to the virtual object may comprise a graphical image, such as a pictorial representation of the athlete, or a dynamic image such as a video clip of the featured athlete performing the basketball play.

Figure 2A:
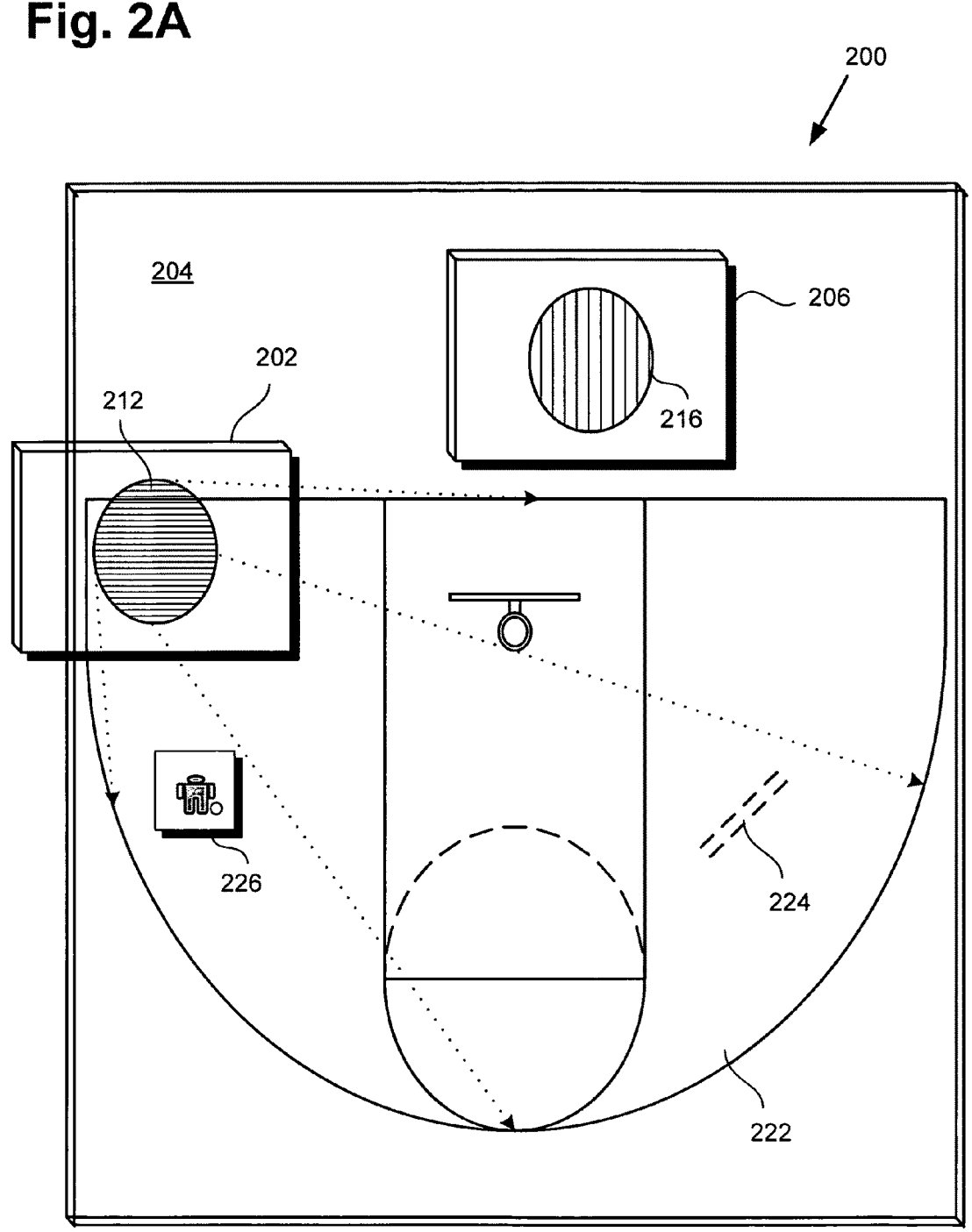
FIG. 2A shows operation of the system of FIG. 1 from the perspective of a real-time performer producing the performance, according to one embodiment of the present invention.
Figure 2B:
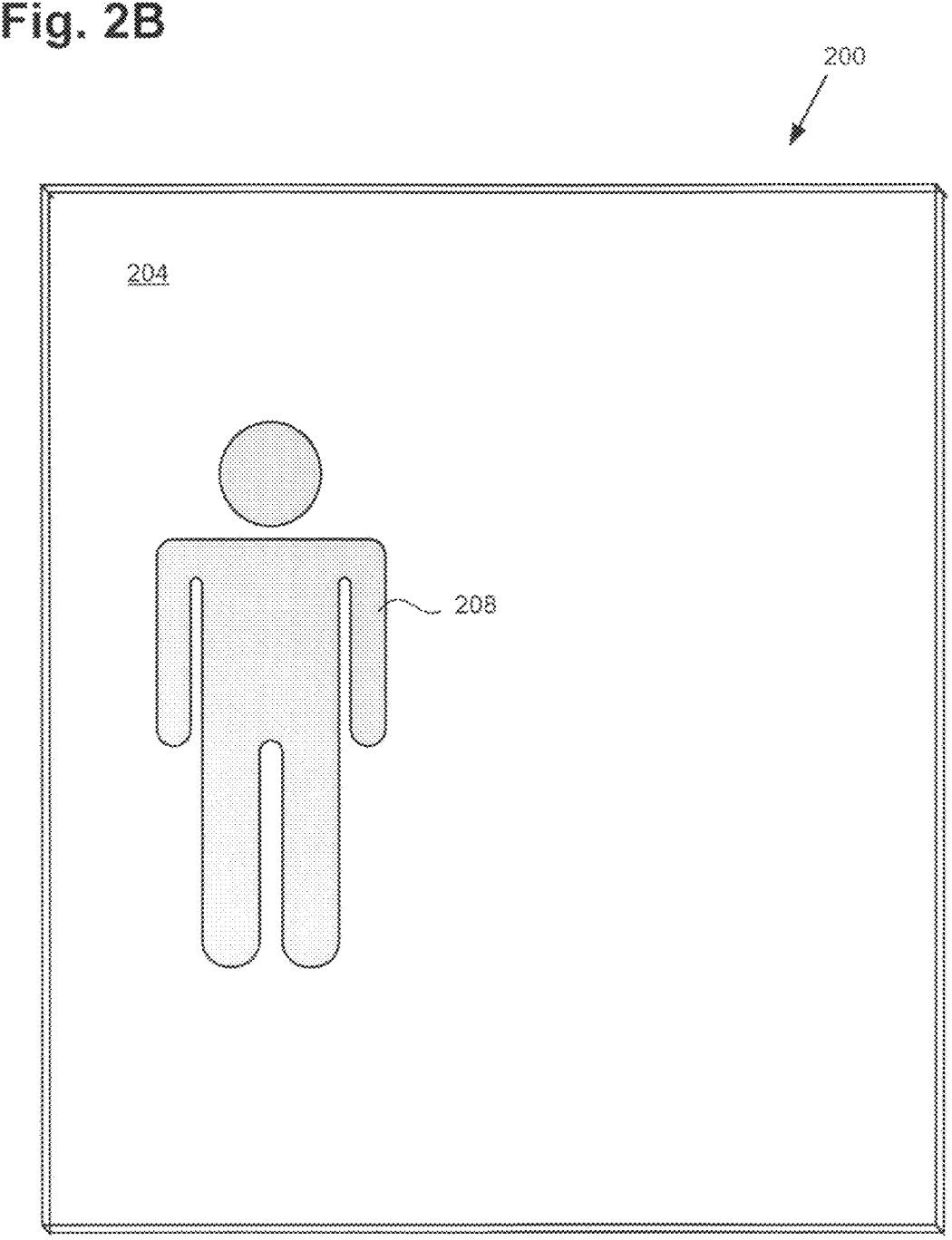
FIG. 2B shows operation of the system of FIG. 1 from the perspective of a recording module for the performance, according to one embodiment of the present invention.

The various features and advantages of system 100 will now be further described by reference to FIGS. 2A and 2B. FIG. 2A shows operation of a system corresponding to system 100, in FIG. 1, from the perspective of real-time performer 108 along arrows 2A-2A in FIG. 1, according to one embodiment of the present invention. FIG. 2B shows operation of the same system from the perspective of recording module 106 along arrows 2B-2B in FIG. 1, according to one embodiment of the present invention.

Referring first to FIG. 2A, FIG. 2A shows system 200 from the perspective of a real-time performer (not shown in FIG. 2A). System 200, in FIG. 2, corresponds to system 100, in FIG. 1, viewed from the perspective of real-time performer 108. As shown in FIG. 2A, system 200 comprises projection module 202 including polarizing filter 212, surface 204 displaying polarized visible image 222, and recording module 206 including reverse-polarizing filter 216. Also shown in FIG. 2A are additional polarized visible images displayed on surface 204, including mark 224 and video clip 226.

Projection module 202 including polarizing filter 212, surface 204 displaying polarized visible image 222, and recording module 206 including reverse-polarizing filter 216, in FIG. 2A, correspond respectively to projection module 102 including polarizing filter 112, surface 104 displaying polarized visible image 122, and recording module 106 including reverse-polarizing filter 116, in FIG. 1. It is noted that rendering module 110, in FIG. 1, is not represented in FIG. 2A. As previously explained, in some embodiments of the present invention, a system for synchronizing a performance by a real-time performer with a virtual object may not include a rendering module corresponding to rendering module 110. Alternatively, in other embodiments, some or all of rendering module 110 may be integrated into one or both of projection module 202 and recording module 206.

As shown by FIG. 2A, in the embodiment of system 200 projection module 202 utilizes polarizing filter 212 to generate polarized visible image 222 on surface 204. Continuing with the example introduced during the discussion of FIG. 1, let us assume that system 200 is implemented in a television news studio to simulate interaction of a studio host with a moving image of a basketball player as he or she executes a play. In the present example, polarized visible image 222 comprises a portion of a basketball court, mark 224 may serve as a cue to the host regarding the position of the host on the court, and video clip 226, which may comprise video of the featured athlete executing the highlight, may further serve to cue interaction of the host with a virtual object corresponding to the featured athlete. Thus, as shown in FIG. 2A, the virtual object with which the real-time performer, e.g., studio host, synchronizes his or her movements may be one or more of a virtual environment for the performance, such as a portion of a basketball court, or an athletic competitor, for example.

In some embodiments, system 200 may be configured to generate multiple polarized visible images for display on surface 204, either concurrently in sequence, or using a combination of both modes, for example. For instance, polarized visible image 222 including mark 224 may be generated first by projection module 202 and displayed on surface 204. Because surface 204 displaying polarized visible image 222 including mark 224 is viewable by the host, the host knows where to position himself or herself in the virtual basketball environment to receive a virtual pass from the virtual featured athlete. To continue the performance, polarized visible image 222 may be combined with or replaced by an additional polarized visible image, such as video clip 226 of the real-time featured athlete in action. Video clip 226 corresponding to the presence of the virtual athlete in the studio may enable the host to adjust his or her stance and body position, for example, in a manner appropriate to the unfolding action. Video clip 226 image may then be combined with or replaced by a another polarized visible image corresponding to a virtual basketball being passed to the studio host, for example, enabling the host to receive the pass in a realistic manner.

In some embodiments, transition between, or combination of polarized visible images on surface 204 may be triggered in response to feedback provided by the real-time performer.

For example, in some embodiments, surface 204 may comprise an interactive surface in communication with projection module 202 (communication not represented in FIG. 2A). In those embodiments, a touch or other input provided at surface 204 by real-time performer 208 may be communicated to projection module 202 and be utilized to initiate generation of an additional or alternate polarized visible image for display on the interactive surface, e.g., surface 204. In one such embodiment, for example, surface 104 may be a touch screen displaying one or more polarized visible images such as video clip 226. Interaction of real-time performer 208 with surface 104 may result in selection of one of the one or more video clips, perhaps through multiple touches selecting and relocating video clip 226 on surface 204, or through a drag and drop operation utilizing a sweeping touch of surface 204, which is further described in U.S. patent application Ser. No. 12/383,503, filed Mar. 24, 2009, title "System and Method for Determining Placement of a Virtual Object According to a Real-Time Performance", which is herein incorporated by reference in its entirety.

Moving now to FIG. 2B while continuing to refer to FIG. 2A, FIG. 2B shows system 200 from the perspective of recording module 206, in FIG. 2A. System 200 includes surface 204, which in the present example is shown to be a substantially transparent panel situated between real-time performer 208 and recording module 206. It is noteworthy that FIG. 2B does not show polarized visible image 222, mark 224, or video clip 226 which are currently viewable on surface 204 by real-time performer 208, as shown by FIG. 2A. As may be apparent from FIG. 2B, the polarized visible images viewable by real-time performer 208, who in this case is a human performer, is not visible to recording module 206. This may be understood in light of the fact that recording module 206 is viewing surface 204 through reverse-polarizing filter 216, which, as shown, is configured to block polarized visible image 222, mark 224, and video clip 226.

Some of the advantages accruing from the present invention may be recognized from the embodiment shown in FIGS. 2A and 2B. For example, by projecting a polarized visible image corresponding to a virtual object onto display surface 204 viewable by real-time performer 208, the present system provides real-time performer 208 with cues enabling the real-time performer to synchronize his or her performance with the virtual object. In addition, by blocking those polarized visible image driven cues through use of reverse-polarizing filter 216 on recording module 206, the present example system allows the cueing of the real-time performer to remain substantially transparent to a viewer of the recorded performance.

Moreover, where surface 204 comprises a substantially transparent panel situated between real-time performer 208 and recording module 206, surface 204 becomes in effect a head-up display for real-time performer 208. As a result, in those embodiments, real-time performer 208 may receive visible cues to his or her real-time performance without looking away from, or perhaps even breaking eye contact with, recording module 206. Furthermore, in embodiments including a rendering module, such as rendering module 110, in FIG. 1, the one or more virtual objects may be subsequently rendered into the recorded performance. Consequently the presently disclosed systems are capable of producing a recorded performance that synchronizes the actions of the real-time performer with the presence of one or more virtual objects in a pleasingly realistic manner, while preserving engagement between the real-time performer and a viewing audience of the recorded performance.

Turning now to FIG. 3, FIG. 3 shows a flowchart for synchronizing a performance by a real-time performer with a virtual object, according to one embodiment of the present invention. The steps shown in flowchart 300 are provided merely as examples, however, and any step may consist of one or more substeps or may involve specialized equipment or materials, as known in the art. While steps 310 through 360 indicated in flowchart 300 are sufficient to describe one embodiment of the present method, other embodiments may utilize steps different from those shown in flowchart 300, or may include more, or fewer steps.

Starting with step 310 in FIG. 3 and referring to FIG. 2A, step 310 of flowchart 300 comprises polarizing a visible image corresponding to a virtual object to produce a polarized visible image, e.g., polarized visible image 222. Step 310 may be performed by projection module 202 using polarizing filter 212, for example. As previously explained, polarized visible image 222 may be a still graphical image such as a pictorial representation of the virtual object, or a dynamic image such as video clip 226, for example. In some embodiments, moreover, polarized visible image 222 may correspond to a moving virtual object, or comprise a virtual environment for the performance of the real-time performer, as shown in FIG. 2A.

Continuing with step 320 of flowchart 300 and referring to FIGS. 2A and 2B, step 320 comprises displaying polarized visible image 222 on surface 204 viewable by real-time performer 208. In the embodiment of system 200, step 320 may be performed by projection module 202 including polarizing filter 212, in combination with surface 204.

Moving to step 330 of flowchart 300, in embodiments in which the virtual object comprises a moving image, the present method may include step 330, which comprises simulating movement of the virtual object through corresponding movement of polarized visible image 222 on surface 204. Step 340 can be performed by projection module 202 including polarizing filter 212, in combination with surface 204. In some embodiments, surface 204 may comprise a substantially transparent panel situated between real-time performer 208 and recording module 206. In other embodiments, surface 204 may comprise an interactive surface responsive to inputs provided by real-time performer 208.

Step 340 of flowchart 300 comprises reverse-polarizing images of the performance by real-time performer 208, and of surface 204 displaying polarized visible image 222 to produce reverse-polarized images. Step 340 may be performed by reverse-polarizing filter 216 of recording module 206, for example, and results in blocking of polarized visible images such as polarized visible image 222, mark 224, and video clip 226.

Continuing with step 350 of flowchart 300, step 350 comprises recording the performance by real-time performer 208. Step 350 may be performed by recording module 206. As a result of the described steps, the present method produces performance cueing that remains substantially invisible or transparent to a viewer of the recorded performance, but which nevertheless enables the real-time performer to synchronize his or her interaction with one or more virtual objects.

As shown by step 360 of flowchart 300, in some embodiments the present method may further include a step of rendering the virtual object into the recorded performance. Referring to FIG. 1, step 360 may be performed by rendering module 110 included in some embodiments of a system for synchronizing a performance by a real-time performer with a virtual object, such as system 100.

Accordingly, by projecting a polarized visible image corresponding to a virtual object onto a display surface viewable by a real-time performer, the disclosed systems and methods provide a real-time performer with cues enabling the real-time performer to synchronize his or her performance with the virtual object. By blocking the polarized visible images through use of a reverse-polarizing filter provided on a recording module, the disclosed systems and methods allow the cueing of the real-time performer to remain unnoticed by a viewer of the recorded performance. In addition, in embodiments in which the viewable surface comprises a substantially transparent panel situated between the real-time performer and the recording module, the real-time performer may receive visible cues to his or her real-time performance without looking away from or disengaging from the viewing audience. Consequently the disclosed systems and methods are capable of producing a recorded performance that synchronizes the actions of the real-time performer with the presence of one or more virtual objects in a pleasingly realistic manner, while preserving an intimate connection between the real-time performer and his or her audience.

Thus, a system and method for synchronizing performance by a real-time performer with a virtual object has been described. From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. It should also be understood that the invention is not limited to the particular embodiments described herein, but is capable of many rearrangements, modifications, and substitutions without departing from the scope of the invention.

What is claimed is:

1. A system for recording a performance by a real-time performer interacting with a virtual object, the system comprising:
   a projection module including a polarizing filter, the projection module configured to generate a polarized visible image corresponding to the virtual object;
   a surface for displaying the polarized visible image, the surface viewable by the real-time performer;
   a recording module including a reverse-polarizing filter, the reverse-polarizing filter configured to reverse-polarize images of the performance by the real-time performer and the surface displaying the polarized visible image to produce reverse-polarized images; and wherein the recording module is configured to record the reverse-polarized images.

2. The system of claim 1, wherein the real-time performer is a human performer.

3. The system of claim 1, wherein the virtual object comprises a moving image.

4. The system of claim 1, wherein the virtual object comprises a virtual environment for the performance.

5. The system of claim 1, wherein the polarized visible image comprises a graphical image.

6. The system of claim 1, wherein the polarized visible image comprises a video clip.

7. The system of claim 1, wherein the surface comprises a touch screen capable of detecting touches by the real-time performer.

8. The system of claim 1, wherein the surface comprises a substantially transparent panel situated between the real-time performer and the recording module.

9. The system of claim 1, wherein the projection module is further configured to simulate movement of the virtual object through corresponding movement of the polarized visible image displayed on the surface.

10. The system of claim 1, further comprising a rendering module configured to render the virtual object into the recorded performance.

11. A method for recording a performance by a real-time performer interacting with a virtual object, the method comprising:
   polarizing a visible image corresponding to the virtual object to produce a polarized visible image;
   displaying the polarized visible image on a surface viewable by the real-time performer;
   reverse-polarizing images of the performance by the real-time performer and the surface displaying the polarized visible image to produce reverse-polarized images; and
   recording the reverse-polarized images.

12. The method of claim 11, wherein the performance includes interactions between the performance of a human performer and the virtual object.

13. The method of claim 11, wherein the virtual object comprises a moving image.

14. The method of claim 11, wherein the virtual object comprises a virtual environment for the performance.

15. The method of claim 11, wherein the polarized visible image comprises a graphical image.

16. The method of claim 11, wherein the polarized visible image comprises a video clip.

17. The method of claim 11, wherein the surface comprises a touch screen capable of detecting touches by the real-time performer.

18. The method of claim 11, wherein the surface comprises a substantially transparent panel situated between the real-time performer and the recording module.

19. The method of claim 11, further comprising simulating movement of the virtual object through corresponding movement of the polarized visible image on the surface.

20. The method of claim 11, further comprising rendering the virtual object into the recorded performance.

* * * * *